United States Patent
Friedberger et al.

(10) Patent No.: US 12,337,387 B2
(45) Date of Patent: Jun. 24, 2025

(54) LAYER CONSTRUCTION METHOD AND LAYER CONSTRUCTION DEVICE FOR ADDITIVELY MANUFACTURING AT LEAST ONE COMPONENT REGION OF A COMPONENT, AND COMPUTER PROGRAM PRODUCT AND STORAGE MEDIUM

(71) Applicant: MTU Aero Engines AG, Munich (DE)

(72) Inventors: Katrin Friedberger, Odelzhausen (DE); Sebastian Rott, Munich (DE); Steffen Schlothauer, Erdweg (DE); Wolfgang Nietsch, Odelzhausen (DE)

(73) Assignee: MTU Aero Engines AG, Munich (DE)

( * ) Notice: Subject to any disclaimer, the term of this patent is extended or adjusted under 35 U.S.C. 154(b) by 791 days.

(21) Appl. No.: 17/626,935

(22) PCT Filed: Jul. 13, 2020

(86) PCT No.: PCT/DE2020/000152
§ 371 (c)(1),
(2) Date: Jan. 13, 2022

(87) PCT Pub. No.: WO2021/008640
PCT Pub. Date: Jan. 21, 2021

(65) Prior Publication Data
US 2022/0288690 A1    Sep. 15, 2022

(30) Foreign Application Priority Data
Jul. 16, 2019 (DE) .................. 10 2019 210 487.8

(51) Int. Cl.
*B22F 5/00* (2006.01)
*B22F 5/04* (2006.01)
(Continued)

(52) U.S. Cl.
CPC .............. *B22F 5/009* (2013.01); *B22F 10/00* (2021.01); *B22F 10/28* (2021.01); *B22F 10/36* (2021.01);
(Continued)

(58) Field of Classification Search
CPC .......... B22F 5/009; B22F 10/00; B22F 10/66; B22F 10/64; B22F 12/49; B22F 10/36;
(Continued)

(56) References Cited

U.S. PATENT DOCUMENTS

2017/0197248 A1    7/2017    Giulietti
2018/0214955 A1*   8/2018    Kottilingam ............ B22F 10/28
(Continued)

FOREIGN PATENT DOCUMENTS

DE    112014005916 T5    9/2016
DE    102015224324 A1    6/2017
(Continued)

OTHER PUBLICATIONS

Cabanettes, F., et al., "Topography of as built surfaces generated in metal additive manufacturing: A multi scale analysis from form to roughness," Precision Engineering 52 (2018) 249-265M.
(Continued)

*Primary Examiner* — Elizabeth M Kerr
*Assistant Examiner* — Simpson A Chen
(74) *Attorney, Agent, or Firm* — Hinckley, Allen & Snyder, LLP; David Josephs

(57) ABSTRACT

The layer construction method comprises at least the following steps: a) applying at least one powder layer of a material to at least one construction and joining zone of at least one movable construction platform; b) locally solidifying the material to form a component layer, wherein the material is selectively scanned along scan lines by at least one energy beam and fused; c) lowering the construction
(Continued)

platform layer by layer by a predefined layer thickness; and
d) repeating the steps a) to c) until the component region is complete.

In step b), a distance $h_s$ between at least two central lines of neighboring scan lines in at least one component layer is adjusted in accordance with Formula I $$0.85 \leq b_{smin}/h_s \leq 1.00 \qquad (I)$$

wherein $b_{smin}$ represents a minimum melt pool width of the scan lines.

16 Claims, 4 Drawing Sheets

(51) Int. Cl.
| | |
|---|---|
| *B22F 10/00* | (2021.01) |
| *B22F 10/28* | (2021.01) |
| *B22F 10/36* | (2021.01) |
| *B22F 10/366* | (2021.01) |
| *B22F 10/64* | (2021.01) |
| *B22F 10/66* | (2021.01) |
| *B22F 12/17* | (2021.01) |
| *B22F 12/41* | (2021.01) |
| *B22F 12/44* | (2021.01) |
| *B22F 12/49* | (2021.01) |
| *B33Y 10/00* | (2015.01) |
| *B33Y 30/00* | (2015.01) |
| *B33Y 40/20* | (2020.01) |
| *B33Y 80/00* | (2015.01) |

(52) U.S. Cl.
CPC ............ *B22F 10/366* (2021.01); *B22F 10/64* (2021.01); *B22F 10/66* (2021.01); *B22F 12/49* (2021.01); *B33Y 10/00* (2014.12); *B33Y 30/00* (2014.12); *B33Y 40/20* (2020.01); *B22F 5/04* (2013.01); *B22F 12/17* (2021.01); *B22F 12/41* (2021.01); *B22F 12/44* (2021.01); *B33Y 80/00* (2014.12)

(58) Field of Classification Search
CPC ........ B22F 10/28; B22F 10/366; B22F 12/17; B22F 12/44; B22F 12/41; B22F 5/04; B33Y 10/00; B33Y 30/00; B33Y 40/20; B33Y 80/00
USPC ..................................................... 219/121.65
See application file for complete search history.

(56) References Cited

U.S. PATENT DOCUMENTS

| | | | |
|---|---|---|---|
| 2018/0229303 A1* | 8/2018 | Burlatsky | B33Y 50/02 |
| 2019/0299290 A1* | 10/2019 | Kuhns | B22F 10/38 |
| 2021/0146446 A1* | 5/2021 | Pays | B22F 3/105 |
| 2021/0154923 A1* | 5/2021 | Voiron | B33Y 40/20 |

FOREIGN PATENT DOCUMENTS

| | | |
|---|---|---|
| DE | 102018115324 A1 | 1/2019 |
| EP | 3175941 A1 | 6/2017 |
| EP | 3300885 A1 | 4/2018 |
| EP | 3461571 A1 | 4/2019 |
| WO | 2017079091 A1 | 5/2017 |

OTHER PUBLICATIONS

Merkt, Simon Jens, "Qualifizierung von generativ gefertigten Gitterstrukturen fur massgeschneiderte Bauteifunktionen", Dissertation RWTH Aachen, Oct. 2015.
Keller, Niels, "Verzugsminimierung bei selektiven Laserschmelzverfahren durch Multi-Skalen_Simulation," Dissertation Universitat Bremen, 2016, https://d-nb.info/1128793571/34.
Nadammal, Naresh et al., "Effect of hatch length on the development of microstructure, texture and residual stresses in selective laser melted superalloy Inconel 718," Materials and Design 134 (2017) 139-150.
Hanzl, Pavel et al., "The Influence of Processing Parameters on the Mechanical Properties of SLM Parts," Procedia Engineering 100 (2015) 1405-1413.
Mishra, Pragya et al., "Energy efficiency contributions and losses during selective laser melting," Journal of Laser Applications, Laser Institute of America, US, vol. 30, No. 3, Aug. 2018.

* cited by examiner

LAYER CONSTRUCTION METHOD AND LAYER CONSTRUCTION DEVICE FOR ADDITIVELY MANUFACTURING AT LEAST ONE COMPONENT REGION OF A COMPONENT, AND COMPUTER PROGRAM PRODUCT AND STORAGE MEDIUM

BACKGROUND OF THE INVENTION

The invention relates to a layer construction method and a layer construction device for additively manufacturing at least one component region of a component. The invention further relates to a computer program product, to a computer-readable storage medium, and to a component having at least one additively manufactured component region.

Additive layer construction methods refer to processes in which, on the basis of a virtual model of a component or component region that is to be manufactured, geometric data are determined and are divided up to obtain layer data (so-called "slices"). Depending on the geometry of the model, an exposure or irradiation strategy is determined, according to which the selective solidification of a material is to take place. In the layer construction method, the desired material is then deposited layer by layer and is scanned and solidified selectively by the at least one energy beam in order to build up additively the desired component region. Various irradiation parameters, such as, for example, the energy beam power and the exposure speed of an energy beam to be used for the solidification, are of importance for the resulting microstructure. In addition, the arrangement of so-called scan lines is of importance. The scan lines, which may also be referred to as melt traces or as exposure vectors, define the paths along which the at least one energy beam scans and melts the material and, in general, can extend linearly or non-linearly. Accordingly, additive or generative manufacturing methods differ from conventional material-removing or primary shaping methods of fabrication. Examples of additive manufacturing methods are generative laser sintering or laser melting methods, which, for example, can be used for the manufacture of components for turbomachines, such as aircraft engines. In selective laser melting, thin layers of powder of the material or materials are applied onto a construction platform and melted and solidified locally in the region of a construction and joining zone by use of one laser beam or a plurality of laser beams. Subsequently, the construction platform is lowered, a further layer of powder is applied and is once again locally solidified. This cycle is repeated until the finished component or the finished component region is obtained. As need be, the component can subsequently be further processed or else used without further processing steps. In selective laser sintering, the component is manufactured in a similar way by laser-assisted sintering of powdered materials. The supply of energy here occurs, for example, by way of laser beams of a $CO_2$ laser, a Nd:YAG laser, a Yb fiber laser, a diode laser, or the like. Also known are electron beam methods, in which the material is scanned and solidified selectively by one electron beam or a plurality of electron beams.

Regarded as a drawback of the known layer construction methods is the circumstance that components manufactured in this way often exhibit a relatively high microstructure anisotropy, which leads to different direction-dependent mechanical properties. This results in diminished strengths and rigidities, which have to be taken into consideration and compensated for in the component design.

SUMMARY OF THE INVENTION

An object of the present invention is to improve a layer construction method and a layer construction device of the kind mentioned in the introduction such that it is possible to manufacture components or component regions with more uniform mechanical properties in all directions. Further objects of the invention consist in presenting a computer program product and a computer-readable storage medium that enable a corresponding control of such a layer construction device. Finally, an object of the invention is to present a component having at least one additively manufactured component region with more uniform mechanical properties in all directions.

The objects are achieved in accordance with the invention by a layer construction method, by a layer construction device, by a computer program product, by a computer-readable storage medium, as well as by a component in accordance with the present invention. Advantageous embodiments with appropriate further developments of the invention are discussed in detail below, whereby advantageous embodiments of each aspect of the invention are to be regarded as advantageous embodiments of the other respective aspects of the invention.

A first aspect of the invention relates to a layer construction method for additively manufacturing at least one component region of a component, in particular a component of a turbomachine. The layer construction method comprises at least the steps a) applying at least one layer of powder of a material to at least one construction and joining zone of at least one movable construction platform; b) locally solidifying the material to form a component layer wherein the material is selectively scanned along scan lines by at least one energy beam and fused; c) lowering the construction platform layer by layer by a predefined layer thickness; and d) repeating the steps a) to c) until the component region is complete. A component or component region with more uniform mechanical properties in all directions, that is, with an isotropic or at least largely isotropic microstructure, is achieved in accordance with the invention in that, in step b), a distance $h_s$ between at least two central lines of neighboring scan lines in at least one component layer is adjusted in accordance with Formula I $$0.85 \leq b_{smin}/h_s \leq 1.00 \quad (I)$$

wherein $b_{smin}$ represents a minimum melt pool width of the scan lines. In other words, it is provided in accordance with the invention that, for a component that is as free of binding defects as possible and has more uniform properties in all directions and a superfine microstructure for increasing the strength, the distance between the central lines of at least two scan lines that lie directly adjacent to one another in the component layer is adjusted in such a way that the quotient $b_{smin}/h_s$ is 0.85, 0.851, 0.852, 0.853, 0.854, 0.855, 0.856, 0.857, 0.858, 0.859, 0.860, 0.861, 0.862, 0.863, 0.864, 0.865, 0.866, 0.867, 0.868, 0.869, 0.870, 0.871, 0.872, 0.873, 0.874, 0.875, 0.876, 0.877, 0.878, 0.879, 0.880, 0.881, 0.882, 0.883, 0.884, 0.885, 0.886, 0.887, 0.888, 0.889, 0.890, 0.891, 0.892, 0.893, 0.894, 0.895, 0.896, 0.897, 0.898, 0.899, 0.900, 0.901, 0.902, 0.903, 0.904, 0.905, 0.906, 0.907, 0.908, 0.909, 0.910, 0.911, 0.912, 0.913, 0.914, 0.915, 0.916, 0.917, 0.918, 0.919, 0.920, 0.921, 0.922, 0.923, 0.924, 0.925, 0.926, 0.927, 0.928, 0.929, 0.930, 0.931, 0.932, 0.933, 0.934, 0.935, 0.936, 0.937, 0.938, 0.939, 0.940, 0.941, 0.942, 0.943, 0.944, 0.945, 0.946, 0.947, 0.948, 0.949, 0.950, 0.951, 0.952, 0.953, 0.954, 0.955, 0.956, 0.957, 0.958, 0.959, 0.960, 0.961, 0.962, 0.963, 0.964, 0.965, 0.966, 0.967, 0.968, 0.969, 0.970, 0.971, 0.972, 0.973, 0.974, 0.975, 0.976, 0.977, 0.978, 0.979, 0.980, 0.981, 0.982, 0.983, 0.984, 0.985, 0.986, 0.987, 0.988, 0.989, 0.990, 0.991, 0.992, 0.993, 0.994, 0.995, 0.996, 0.997, 0.998, 0.999, or 1.00, whereby corresponding intermediate values are regarded as being disclosed as well. The distance $h_s$ is also referred to as the hatch distance and, via the local energy input associated therewith, substantially influences the extension of the resulting grains of material in the construction direction. In general, it holds that a smaller energy input (volume energy) leads to a smaller mean grain size KG and accordingly to a finer-grained microstructure. Preferably, the mentioned quotient $b_{smin}/h_s$ is adjusted for a plurality of scan line pairs, whereby it need not be identically chosen for each scan line pair, but rather can vary within the given limits. Fundamentally, the scan lines can extend either linearly or non-linearly. Furthermore, in a component layer, groups of scan lines can be produced in different patterns (exposure strategy), such as, for example, in the form of a line exposure, a strip exposure, a chess strategy, an island strategy, etc. In general, in the scope of this disclosure "a" is to be read as an indefinite article, that is, in the absence of any explicit statement to the contrary, always also as "at least one." Conversely, "a" can also be understood to mean "only one."

In an advantageous embodiment of the invention, it is provided that, in step b), a laser beam with a power of between 200 W and 300 W, that is, with a power of 200 W, 201 W, 202 W, 203 W, 204 W, 205 W, 206 W, 207 W, 208 W, 209 W, 210 W, 211 W, 212 W, 213 W, 214 W, 215 W, 216 W, 217 W, 218 W, 219 W, 220 W, 221 W, 222 W, 223 W, 224 W, 225 W, 226 W, 227 W, 228 W, 229 W, 230 W, 231 W, 232 W, 233 W, 234 W, 235 W, 236 W, 237 W, 238 W, 239 W, 240 W, 241 W, 242 W, 243 W, 244 W, 245 W, 246 W, 247 W, 248 W, 249 W, 250 W, 251 W, 252 W, 253 W, 254 W, 255 W, 256 W, 257 W, 258 W, 259 W, 260 W, 261 W, 262 W, 263 W, 264 W, 265 W, 266 W, 267 W, 268 W, 269 W, 270 W, 271 W, 272 W, 273 W, 274 W, 275 W, 276 W, 277 W, 278 W, 279 W, 280 W, 281 W, 282 W, 283 W, 284 W, 285 W, 286 W, 287 W, 288 W, 289 W, 290 W, 291 W, 292 W, 293 W, 294 W, 295 W, 296 W, 297 W, 298 W, 299 W, or 300 W is used as the energy beam. It is thereby possible in the case of conventional metallic or intermetallic materials to exert a positive influence on the microstructure and, in particular, to achieve a higher isotropy. This leads to higher strengths and rigidities as well as to a reduction in the effort involved in component design.

In a further embodiment, more uniform properties in all directions and a superfine microstructure for increasing the strength ensue due to the circumstance that, in step b), a mean scan speed of the at least one energy beam is adjusted to a value of between 800 mm/s and 1100 mm/s, that is, for example, to a value of 800 mm/s, 805 mm/s, 810 mm/s, 815 mm/s, 820 mm/s, 825 mm/s, 830 mm/s, 835 mm/s, 840 mm/s, 845 mm/s, 850 mm/s, 855 mm/s, 860 mm/s, 865 mm/s, 870 mm/s, 875 mm/s, 880 mm/s, 885 mm/s, 890 mm/s, 895 mm/s, 900 mm/s, 905 mm/s, 910 mm/s, 915 mm/s, 920 mm/s, 925 mm/s, 930 mm/s, 935 mm/s, 940 mm/s, 945 mm/s, 950 mm/s, 955 mm/s, 960 mm/s, 965 mm/s, 970 mm/s, 975 mm/s, 980 mm/s, 985 mm/s, 990 mm/s, 995 mm/s, 1000 mm/s, 1005 mm/s, 1010 mm/s, 1015 mm/s, 1020 mm/s, 1025 mm/s, 1030 mm/s, 1035 mm/s, 1040 mm/s, 1045 mm/s, 1050 mm/s, 1055 mm/s, 1060 mm/s, 1065 mm/s, 1070 mm/s, 1075 mm/s, 1080 mm/s, 1085 mm/s, 1090 mm/s, 1095 mm/s, or 1100 mm/s, whereby corresponding intermediate values, such as, for example, 900 mm/s, 901 mm/s, 902 mm/s, 903 mm/s, 904 mm/s, 905 mm/s, 906 mm/s, 907 mm/s, 908 mm/s, 909 mm/s, 910 mm/s, etc., are regarded as being disclosed as well.

A further spatial equalization of the properties of the component or component region is achieved in a further embodiment in that the construction platform in step c) is lowered by a layer thickness of between 30 μm and 50 μm, that is, by 30 μm, 31 μm, 32 μm, 33 μm, 34 μm, 35 μm, 36 μm, 37 μm, 38 μm, 39 μm, 40 μm, 41 μm, 42 μm, 43 μm, 44 μm, 45 μm, 46 μm, 47 μm, 48 μm, 49 μm, or 50 μm. In general, it can be provided that each component layer is produced with the same layer thickness or that the layer thickness is varied one or more times during the layer-by-layer construction.

In an further advantageous embodiment of the invention, it is provided that, in step b), the hatch distance $h_s$ between at least two central lines of neighboring scan lines is adjusted to a value of between 130 μm and 150 μm, that is, for example, to a value of 130 μm, 131 μm, 132 μm, 133 μm, 134 μm, 135 μm, 136 μm, 137 μm, 138 μm, 139 μm, 140 μm, 141 μm, 142 μm, 143 μm, 144 μm, 145 μm, 146 μm, 147 μm, 148 μm, 149 μm, or 150 μm. This contributes advantageously to the creation of an at least largely isotropic or quasi-isotropic microstructure.

Further advantages ensue in that the hatch distance $h_s$ between the majority of central lines of adjacent scan lines or the hatch distance $h_s$ between all central lines of adjacent scan lines is adjusted in at least one component layer in accordance with Formula I. In other words, it is provided that the quotient defined in Formula I is adjusted for a plurality or all of the scan line pairs of an individual component layer. This likewise contributes advantageously to the creation of an at least largely isotropic or quasi-isotropic microstructure.

Further advantages ensue when a material taken from the group composed of steel, aluminum alloys, titanium alloys, cobalt-based alloys, chromium-based alloy, nickel-based alloy, copper alloys, intermetallic alloys, or any mixtures thereof is used. Although, fundamentally, the material can also be a plastic, such as, for example, ABS, PLA, PETG, nylon, PET, PTFE, or the like, it is generally possible by using metallic and/or intermetallic materials to manufacture components or component regions with greater mechanical, thermal, and chemical resistance. For example, the material can contain elements taken from the group composed of iron, titanium, nickel, chromium, cobalt, copper, aluminum, and titanium. The material can be an alloy taken from the group composed of steel, aluminum alloy, titanium alloy, cobalt alloy, chromium alloy, nickel-based alloy, and copper alloys. For example, the material can be a high-temperature-resistant nickel-based alloy, such as, for instance, Mar M-247, Inconel 718 (IN718), Inconel 738 (IN738), Waspaloy, or C263. Likewise, intermetallic alloys, such as $Mg_2Si$ and titanium aluminide, can be provided.

Further advantages ensue in that at least the component region is subjected to a thermal treatment after its production, in particular to a hot isostatic pressing process. In the scope of the present invention, a thermal treatment is understood to mean a process in which a temperature of the component region or of the entire component is varied in order to alter the material and, in particular, the microstructure properties thereof. Preferably, the thermal treatment comprises or is a hot isostatic pressing (HIP), in which a high pressure is used in order to improve the material properties. The pressure is applied to the component, for example, by an inert gas (e.g., argon). The pressure and an elevated temperature in comparison to room temperature result in plastic deformation, creep, and/or diffusion. It is likewise possible to eliminate any internal microporosity or other defects and thereby to improve the mechanical properties of the component. Hot isostatic pressing also makes it possible to bind the component to further materials, which can be present either in solid form or in powder form.

A second aspect of the invention relates to a layer construction device for additively manufacturing at least one component region of a component by use of an additive layer construction method. The layer construction device comprises at least one powder feed for the application of at least one layer of powder of a material to at least one construction and joining zone of at least one movable construction platform, at least one radiation source for producing at least one energy beam for the layer-by-layer and local solidification of the material by selective scanning and melting of the material along scan lines, and a control device. The control device is designed to control the powder feed in such a way that it applies at least one layer of powder of the material to the construction and joining zone of the construction platform and to control the construction platform in such a way that it is lowered layer by layer by a predefined layer thickness. A manufacture of components or component regions with more uniform mechanical properties in all directions, that is, at least largely or completely without preferred orientation in the microstructure, is possible in accordance with the invention in that the control device is configured in such a way that, in at least one component layer, a hatch distance $h_s$ between at least two central lines of neighboring scan lines is adjusted in accordance with Formula I $$0.85 \leq b_{smin}/h_s \leq 1.00 \tag{I}$$

wherein $b_{smin}$ designates a minimum melt pool width of the scan lines. Further features and the advantages thereof may be taken from the descriptions of the first aspect of the invention, whereby advantageous embodiments of the first aspect of the invention are also to be regarded as advantageous embodiments of the second aspect of the invention. Conversely, advantageous embodiments of the second aspect of the invention are also to be regarded as advantageous embodiments of the first aspect of the invention.

In an advantageous embodiment of the invention, it is provided that the layer construction device is designed as a selective laser sintering and/or laser-melting device. It is thereby possible to produce component regions and to manufacture complete components having mechanical properties that are at least largely independent of direction. For the production of a laser beam, it is possible to provide, for example, a $CO_2$ laser, a Nd:YAG laser, a Yb fiber laser, a diode laser, or the like. It can also be provided that two or more electron beams and/or laser beams are used, the exposure or solidification parameters of which are adapted or adjusted in the previously described way.

A further aspect of the invention relates to a computer program product, comprising commands that, when the computer program is executed by a control device of a layer construction device in accordance with the second aspect of the invention, cause the layer construction device to carry out the layer construction method in accordance with the first aspect of the invention. A further aspect of the invention relates to a computer-readable storage medium, comprising commands that, when executed by a control device of a layer construction device in accordance with the second aspect of the invention, cause the layer construction device to carry out the layer construction method in accordance with the first aspect of the invention.

The present invention can be realized by using a computer program product that comprises program modules, which are accessible from a computer-usable or computer-readable medium and store program code that is used by or in conjunction with one computer, processor, or command execution system or else a plurality of computers, processors, or command execution systems of a layer construction device. For the purposes of this description, a computer-usable or computer-readable medium can be any device that can contain, store, communicate, transmit, or transport the computer program products of use, by or in conjunction with the command execution system, of the device, or to the device. The medium can be an electronic, magnetic, optical, electromagnetic, infrared, or semiconductor system or a transmission system as such, because signal carriers are not included in the definition of the physical, computer-readable medium. Included herein are a semiconductor or solid-state memory, magnetic tape, an exchangeable computer diskette, a random-access memory (RAM), a read-only memory (ROM), a hard magnetic disk, and an optical disk, such as a read-only memory (CD-ROM, DVD, Blue-Ray, etc.), or a rewritable optical disk (CD-R, DVD-R). Both processors and program code can be centralized or distributed (or a combination thereof) for implementation of individual aspects of the invention.

A further aspect of the invention relates to a component, in particular a turbine component of a turbomachine, comprising at least one component region that is manufactured by a layer construction device in accordance with the second aspect of the invention and/or by a layer construction method in accordance with the first aspect of the invention. In this case, the component according to the invention has a strongly equalized microstructure that is at least largely independent of direction and leads to a substantially higher resistance toward cyclic loads as well as to significantly higher strength and rigidity values. The resulting features and the advantages thereof may be taken from the descriptions of the first and second aspects of the invention, whereby advantageous embodiments of each aspect of the invention are also to be regarded as advantageous embodiments of the other respective aspects of the invention. The component can be designed as a turbine blade for a gas turbine, in particular for an aircraft engine.

BRIEF DESCRIPTION OF THE DRAWING FIGURES

Further features of the invention ensue from the claims, the figures, and the description of the figures. The features and combinations of features mentioned in the above description as well the features and combinations of features mentioned below in the description of the figures and/or solely in the figures can be used not only in the respectively presented combination, but also in other combinations, without departing from the scope of the invention. Hence, the invention is also regarded as comprising and disclosing embodiments that are not shown and explained explicitly in the figures, but ensue and can be produced by separated combinations of features taken from the explained embodiments. Also regarded as being disclosed are embodiments and combinations of features that, accordingly, do not have all features of an independent claim as originally formulated. Moreover, embodiments and combinations of features are regarded as being disclosed, in particular by way of the embodiments explained above, that go beyond or depart from the combinations of features presented in reference to the claims. Herein:

Figure 3:
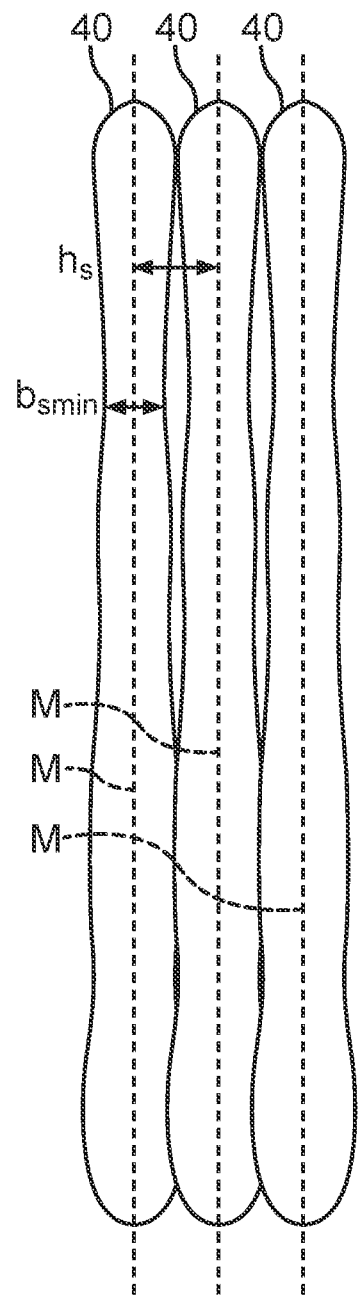
Figure 4:
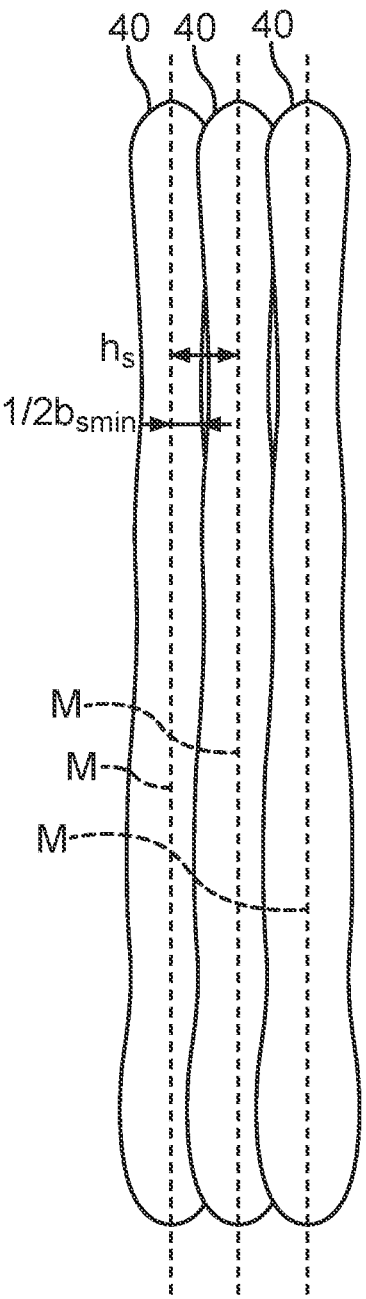
Figure 5:
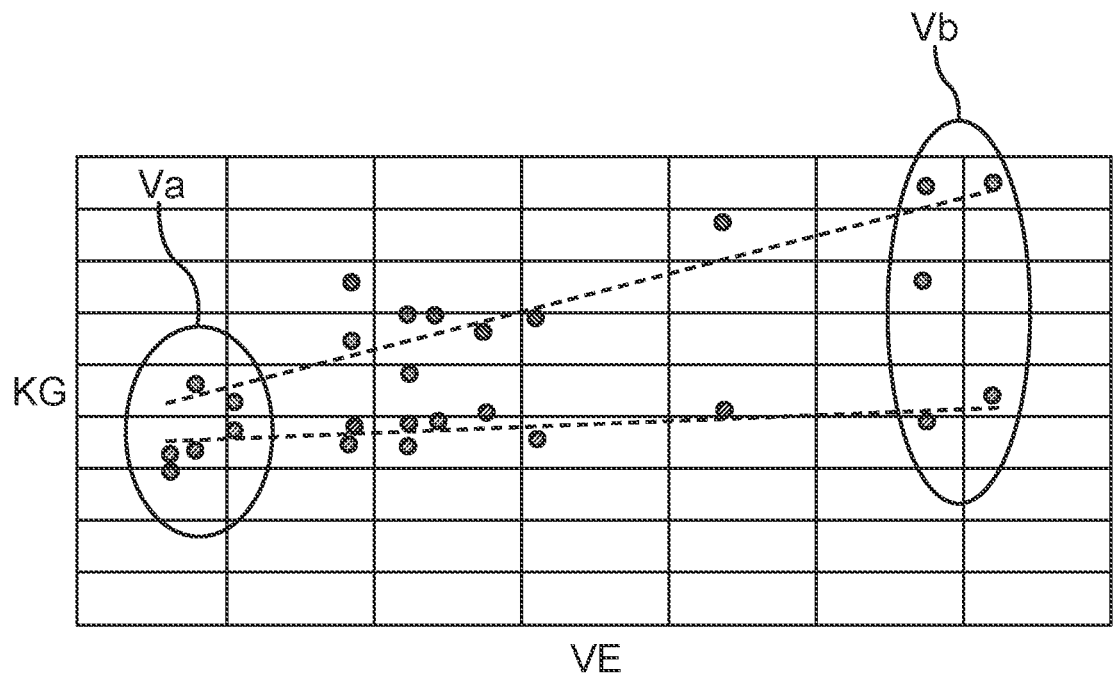
Figure 6:
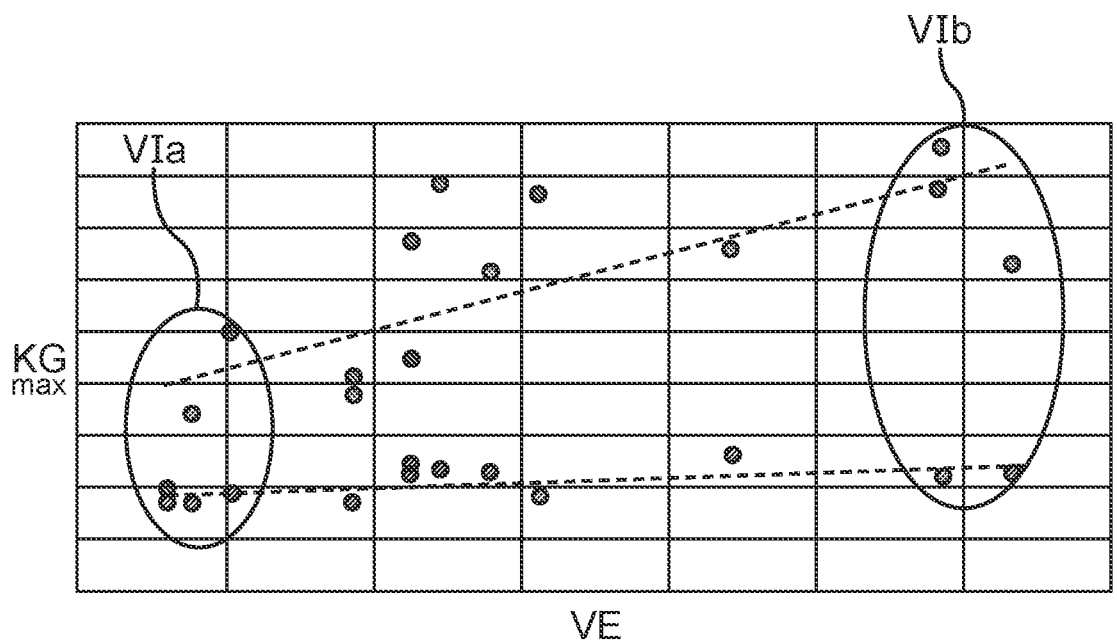
Figure 7:
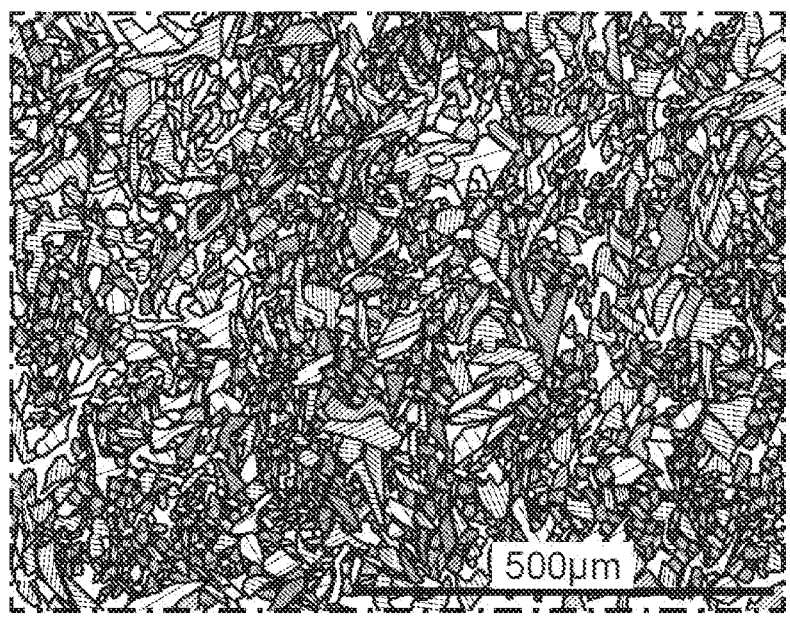
Figure 8:
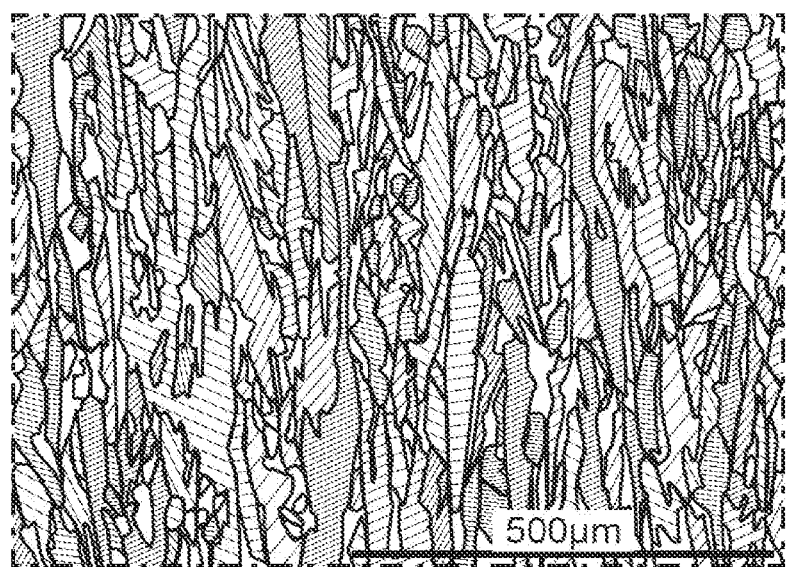

FIG. 3 a schematic illustration of three scan lines that are spaced apart from one another in accordance with the invention;

FIG. 4 shows a schematic illustration of three scan lines that are arranged at a hatch distance that is not in accordance with the invention;

FIG. 5 shows a diagram in which, on the abscissa axis, an input volume energy is plotted and, on the ordinate axis, a resulting mean grain size of an additively manufactured component is plotted;

FIG. 6 shows a diagram in which, on the abscissa axis, an input volume energy is plotted and, on the ordinate axis, a resulting maximum grain size of an additively manufactured component is plotted;

FIG. 7 shows a microstructure slice image of a microstructure in the regions Va and VIa shown in FIG. 5 and FIG. 6; and FIG. 8 shows a microstructure slice image of a microstructure in the region Vb and VIb shown in FIG. 5 and FIG. 6.

DESCRIPTION OF THE INVENTION

Figure 1:
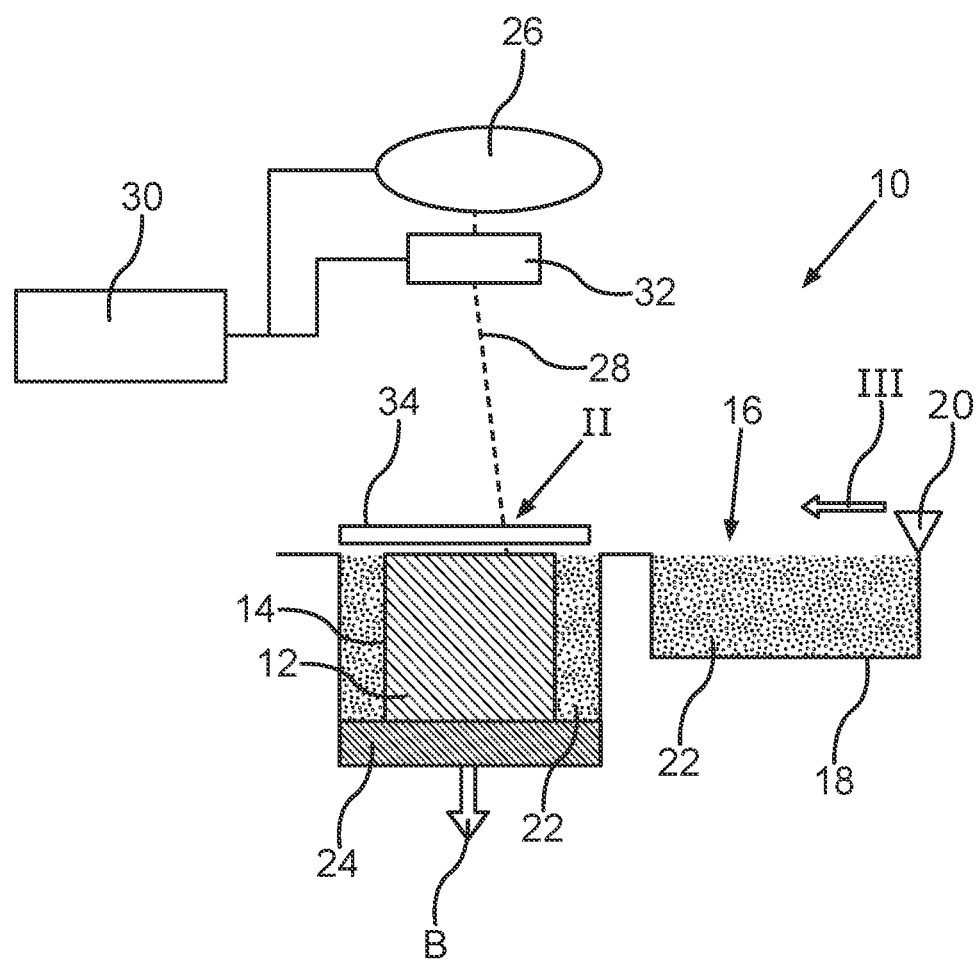
FIG. 1 shows a schematic sectional view of a layer construction device according to the invention.

FIG. 1 shows a schematic sectional view of a layer construction device 10 according to the invention. The layer construction device 10 serves for the additive manufacture of at least one component region 12 of a component 14 by an additive layer construction method. The layer construction device 10 comprises at least one powder feed 16 with a powder tank 18 and a coater 20. The powder feed 16 serves for applying at least one layer of powder of a material 22 to a construction and joining zone II of a construction platform 24 that is movable in accordance with arrow B. To this end, the coater 20 is moved in accordance with arrow III in order to transport the material 22 from the powder tank 18 to the construction and joining zone II. The layer construction device 10 further comprises at least one radiation source 26 for producing at least one energy beam 28 for layer-by-layer and local solidification of the material 22 by selective scanning and melting of the material 22 by the energy beam 28 along scan lines 40 (see FIG. 2). In addition, a control device 30 is provided, which is designed to control the powder feed 16 in such a way that it applies at least one layer of powder of the material 22 to the construction and joining zone II of the construction platform 24, and the construction platform 24 is lowered layer by layer by a predefined layer thickness in accordance with arrow B. In addition, the control device 30 is configured in such a way that, in at least one component layer, a hatch distance $h_s$ between at least two central lines M of neighboring scan lines 40 is adjusted in accordance with Formula I $$0.85 \leq b_{smin}/h_s \leq 1.00 \qquad (I)$$

wherein $b_{smin}$ designates a minimum melt pool width of the scan lines 40. Furthermore, the layer construction device 10 comprises an optical device 32, by which the energy beam 28 can be moved over the construction and joining zone II. The radiation source 26 and the device 32 are coupled to the control device 30 for data exchange. Furthermore, the layer construction device 10 comprises a fundamentally optional heating device 34, by which the powder bed can be thermally adjusted to a desired base temperature. The heating device 34 can comprise, for example, one induction coil or a plurality of induction coils. Alternatively or additionally, it is also possible to provide other heating elements, such as, for example, IR radiators or the like.

Figure 2:
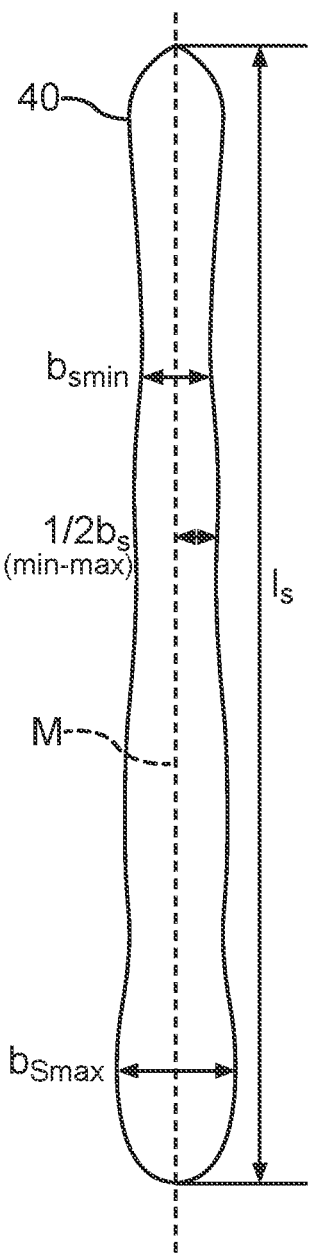
FIG. 2 shows a schematic illustration of a scan line.

FIG. 2 shows a schematic illustration of a scan line 40 that has a length $l_s$ and, in this instance, is linearly executed. The scan line 40 has a central line M, along which the laser beam 28 has been guided and has melted the material 22. As process parameters by way of example, a laser power of 250 W, a scan speed of 960 mm/s, and a layer thickness of 40 μm are set. The scan line 40 further has a region with a minimum melt pool width $b_{smin}$ and a region with a maximum melt pool width $b_{smax}$. The hatch distance between the central line and one edge of the melt pool is formally ½ $b_s$, where the value $b_s$ varies along the scan line 40 between $b_{smin}$ and $b_{smax}$.

FIG. 3 shows a schematic illustration of three scan lines 40, which are spaced apart from one another in accordance with the invention and are produced using the aforementioned process parameters. This means that the hatch distance $h_s$ between neighboring central lines M of the scan lines 40 corresponds to the formula $0.85 \leq b_{smin}/h_s \leq 1.00$ and, in the present example, is about 140 μm. Thereby ensured is the deliberate creation of an at least largely isotropic or quasi-isotropic microstructure that, at least for the most part, is free of defects. It can be seen that the scan lines 40 are arranged at least mostly edge to edge and neither substantially overlap nor exhibit appreciable gaps. In addition, the value $b_s$ varies only slightly along the individual scan lines 40.

FIG. 4 shows a schematic illustration of three scan lines 40, which are arranged from one another at a hatch distance of $h_s$ that is not in accordance with the invention. It can be seen that the scan lines 40 overlap, in part to a great extent, and exhibit substantially more greatly varying widths ($b_s$) in the direction of extension. Nonetheless, at the same time, isolated gaps appear between adjacent scan lines 40. This leads to locally greatly varying energy inputs and, accordingly, to greatly varying grain sizes and a corresponding anisotropic microstructure.

FIG. 5 shows a diagram of an additively manufactured component 14 (not shown), in which, on the abscissa axis, an input volume energy VE in $J/mm^3$ is plotted and, on the ordinate axis, a resulting mean grain size KG in μm is plotted. FIG. 6 shows a diagram of the additively manufactured component 14, in which, on the abscissa axis, the input volume energy VE [$J/mm^3$] is plotted and, on the ordinate axis, a resulting maximum grain size $KG_{max}$ [μm] is plotted. The diagrams illustrate the relationship between the mean and maximum grain size KG, $KG_{max}$ and the input volume energy VE, which also is determined essentially by the hatch distance $h_s$. The regions Va, VIa mark an at least nearly isotropic material state without noteworthy preferred orientation in the microstructure, while the regions Vb, VIb mark strongly anisotropic states or microstructures. Whereas differences transverse to the construction direction can be neglected at least in a first approximation, great differences in the mechanical properties are revealed in the construction direction and are associated with the degree of isotropy or anisotropy of the microstructure.

FIG. 7 shows for further clarification a microstructure slice image of a microstructure in the regions Va and VIa shown in FIG. 5 and FIG. 6, while FIG. 8 shows a microstructure slice image of a microstructure in the regions Vb and VIb shown in FIG. 5 and FIG. 6.

The parameter values given in the documentation for definition of the process and measurement conditions for the characterization of specific properties of the subject of the invention are also to be regarded in the scope of deviations—for example, due to measurement errors, system errors, DIN tolerances, and the like—as being comprised in the scope of the invention.

What is claimed is:

1. A layer construction method for the additive manufacturing of at least one component region of a component, comprising at least the following steps:
   a) applying at least one powder layer of a material to at least one construction and joining zone of at least one movable construction platform;
   b) locally solidifying the material to form a component layer, wherein the material is selectively scanned along scan lines by at least one energy beam and fused; the scan lines varying in width with each having respective minimum and maximum melt pool widths associated therewith; determining a minimum melt pool width associated with the scan lines;
   c) lowering the construction platform layer by layer by a predefined layer thickness; and
   d) repeating the steps a) to c) until the component region is complete,
   wherein, in step b), adjusting a distance $h_s$ between at least two central lines of neighboring scan lines in the component layer in accordance with Formula I $$0.85 \leq b_{smin}/h_s \leq 1.00 \qquad (I)$$

wherein $b_{smin}$ represents a minimum melt pool width of the scan lines determined in step b).

2. The layer construction method according to claim 1, wherein, in step b), a laser beam with a power of between 200 W and 300 W is used as the energy beam.

3. The layer construction method according to claim 1, wherein, in step b), a mean scan speed of the at least one energy beam is adjusted to a value of between 800 mm/s and 1100 mm/s.

4. The layer construction method according to claim 1, wherein the construction platform in step c) is lowered by a layer thickness of between 30 μm and 50 μm.

5. The layer construction method according to claim 1, wherein, in step b), the distance $h_s$ between at least two central lines of neighboring scan lines is adjusted to a value of between 130 μm and 150 μm.

6. The layer construction method according to claim 1, wherein the hatch distance $h_s$ of the majority of the central lines of neighboring scan lines or the distance $h_s$ of all central lines of neighboring scan lines in the component layer is adjusted in accordance with Formula I.

7. The layer construction method according to claim 1, wherein a material taken from the group composed of steel, aluminum alloys, titanium alloys, cobalt-based alloys, chromium-based alloy, nickel-based alloy, copper alloys, intermetallic alloys, or any mixtures thereof is used.

8. The layer construction method according to claim 1, wherein at least the component region is subjected after its production to a hot isostatic pressing process.

9. The layer construction method of claim 1, wherein a computer program product, including commands, is configured and arranged to execute the layer construction method.

10. The layer construction method of claim 1, wherein a computer-readable storage medium, including commands, is configured and arranged to execute the layer construction method.

11. The layer construction method of claim 1, wherein the component is a turbomachine component.

12. A layer construction device for the additive manufacturing of at least one component region of a component by an additive layer construction method, comprising:
   at least one powder feed for applying at least one of powder layer of a material to at least one construction and joining zone of at least one movable construction platform;
   at least one radiation source for producing at least one energy beam for the layer-by-layer and local solidification of the material by selective scanning and fusing of the material along scan lines; the scan lines varying in width with each having respective minimum and maximum melt pool widths associated therewith;
   determining a minimum melt pool width associated with the scan lines; and
   a control device, which is configured and arranged to:
      control the powder feed in such a way that it applies at least one powder layer of the material to the construction and joining zone of the construction platform; and
      control the construction platform in such a way that it is lowered layer by layer by a predefined layer thickness,
   wherein the control device is configured and arranged to adjust, in at least one component layer, a distance $h_s$ between at least two central lines of neighboring scan lines in accordance with Formula I $$0.85 \leq b_{smin}/h_s \leq 1.00 \qquad (I)$$

wherein $b_{smin}$ represents a minimum melt pool width of the scan lines.

13. The layer construction device according to claim 12, wherein it is configured and arranged as a selective laser-sintering and/or laser-melting device.

14. The layer construction device of claim 12, further comprising:
   a computer program product, including commands, is configured and arranged to be executed by the control device.

15. The layer construction device of claim 12, further comprising:
   a computer-readable storage medium, including commands, is configured and arranged to be executed by the control device.

16. The layer construction device of claim 12, wherein the component is a turbomachine component.

* * * * *